(12) United States Patent
Horng et al.

(10) Patent No.: US 8,610,387 B2
(45) Date of Patent: Dec. 17, 2013

(54) MOTOR SYSTEM

(75) Inventors: Alex Horng, Kaohsiung (TW);
Kuan-Yin Hou, Kaohsiung (TW);
Chung-Ken Cheng, Kaohsiung (TW);
Cheng-Tai Cheng, Kaohsiung (TW);
Yu-Fang Li, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 448 days.

(21) Appl. No.: 12/770,845

(22) Filed: Apr. 30, 2010

(65) Prior Publication Data

US 2011/0266989 A1 Nov. 3, 2011

(51) Int. Cl.
*H02P 6/14* (2006.01)

(52) U.S. Cl.
USPC .............. 318/400.26; 318/400.29; 388/907.2

(58) Field of Classification Search
USPC ...................... 318/747, 782, 400.26, 400.29; 388/907.2
See application file for complete search history.

(56) References Cited

U.S. PATENT DOCUMENTS

| | | | | |
|---|---|---|---|---|
| 4,743,824 A * | 5/1988 | Andersson | ............... | 318/696 |
| 5,264,770 A * | 11/1993 | Coutu | ............... | 318/696 |
| 5,359,271 A * | 10/1994 | Husher | ............... | 318/696 |
| 5,541,487 A * | 7/1996 | Yorozu | ............... | 318/685 |
| 6,310,453 B1 * | 10/2001 | Lin | ............... | 318/445 |
| 7,439,698 B2 | 10/2008 | Ludwig et al. | | |
| 7,556,112 B2 | 7/2009 | Suzuki et al. | | |
| 7,701,159 B2 | 4/2010 | Chida et al. | | |
| 7,786,643 B2 | 8/2010 | Bade et al. | | |
| 8,018,186 B2 * | 9/2011 | Frankel et al. | ........ | 318/400.29 |
| 2003/0099561 A1 * | 5/2003 | Heydt et al. | ........ | 417/423.1 |
| 2008/0074068 A1 * | 3/2008 | Takeuchi | ............... | 318/472 |

* cited by examiner

*Primary Examiner* — Rina Duda
(74) *Attorney, Agent, or Firm* — Muncy, Geissler, Olds & Lowe, PLLC

(57) ABSTRACT

A motor system comprises a motor and a driving module. The motor has a plurality coil units not electrically connected to each other. The driving module has a control unit, a driving unit and a circuit board. The control unit is coupled to the driving unit. The driving unit has a plurality of driving circuits. The number of the driving circuits is the same as the number of the coil units. Each of the driving circuits is coupled to a respective one of the coil units so as to form a plurality of independent coil loops. The control unit and the driving unit are mounted on the circuit board.

16 Claims, 12 Drawing Sheets

US 8,610,387 B2

MOTOR SYSTEM

BACKGROUND OF THE INVENTION

1. Field of the Invention

The present invention generally relates to a motor system and, more particularly, to a motor system that controls the rotation of a single motor by a plurality of driving circuits.

2. Description of the Related Art

Motor systems have played a big role in various industrial applications and are essential for systems that operate under motive power, such as a transportation system or fan system. Especially, motors are widely used in fan systems due to the ability to drive a fan for air exchange. Therefore, motors are widely adopted in electronic devices for cooling purpose.

Referring to FIG. 1, a motor system 9 comprising a first motor unit 91 and a second motor unit 92 is disclosed. The first motor unit 91 comprises a first motor 911 and a first driving unit 912; the second motor unit 92 comprises a second motor 921 and a second driving unit 922. The first motor 911 comprises a first coil L1 electrically connected to an output end of the first driving unit 912 so that the first driving unit 912 is able to control the rotation of the first motor 911. Similarly, the second motor 921 comprises a second coil L2 electrically connected to an output end of the second driving unit 922 so that the second driving unit 922 is able to control the rotation of the second motor 921.

In an application where the motor system 9 is used in a fan as shown in FIG. 1, the first motor 911 comprises a rotor coupled to an impeller of the fan and the second motor 921 comprises a rotor coupled to another impeller of the fan. The above impellers may be driven by the first motor 911 and the second motor 921 for cooling purpose of electronic devices.

In the motor system 9, the first motor 911 and the second motor 921 operate independently. Based on the operation independence, operation of the motor system 9 may still be maintained by one of the first motor 911 and the second motor 921 when another one is broken. Thus, cooling of the electronic devices is maintained.

Since the motor system 9 requires two motors 911 and 921, higher cost and larger volume are required. Therefore, it is desired to improve the conventional motor system 9.

SUMMARY OF THE INVENTION

It is therefore the primary objective of this invention to provide a motor system with low cost and small volume.

The invention discloses a motor system comprising a motor and a driving module. The motor has a plurality coil units not electrically connected to each other. The driving module has a control unit, a driving unit and a circuit board. The control unit is coupled to the driving unit. The driving unit has a plurality of driving circuits. The number of the driving circuits is the same as the number of the coil units. Each of the driving circuits is coupled to a respective one of the coil units so as to form a plurality of independent coil loops. The control unit and the driving unit are mounted on the circuit board.

Furthermore, the invention discloses a motor system comprising a motor and a driving module. The motor has a plurality coil units not electrically connected to each other. The driving module has a control unit, a driving unit and a plurality of circuit boards. The control unit is coupled to the driving unit. The driving unit has a plurality of driving circuits. The number of the driving circuits is the same as the number of the coil units. The number of the circuit boards is the same as the number of the driving circuits. Each of the driving circuits is coupled to a respective one of the coil units so as to form a plurality of independent coil loops. Each of the circuit boards is mounted with a respective one of the driving circuits.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIG. 4b shows a circuit diagram of FIG. 4a.

Figure 1:
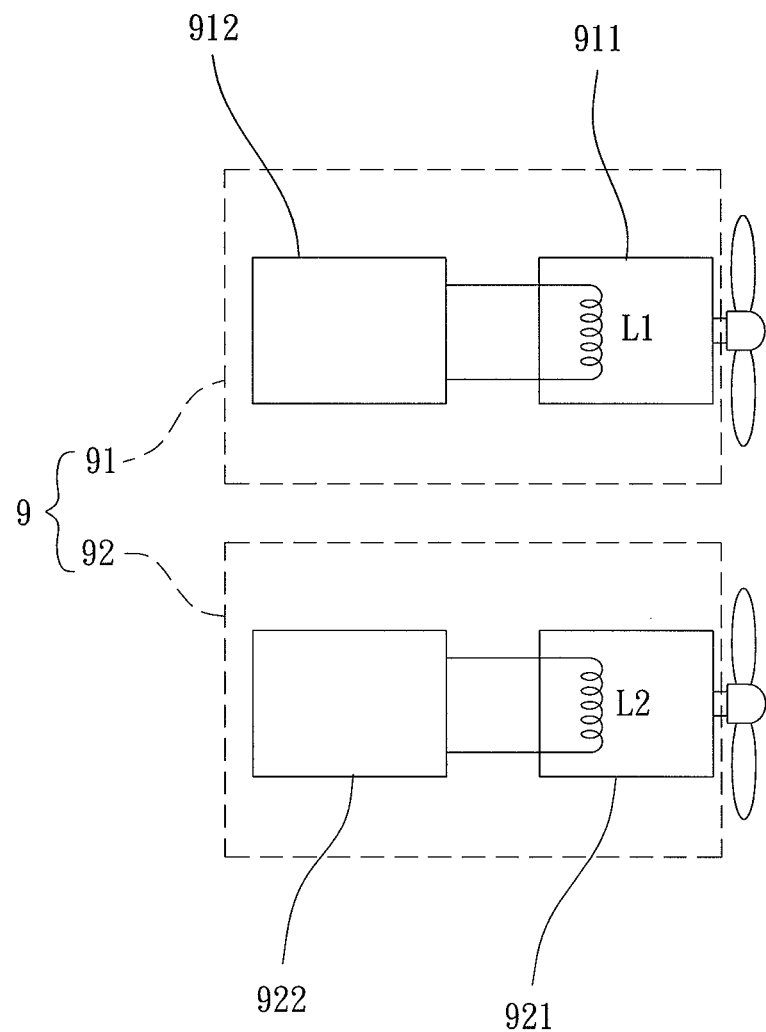
FIG. 1 shows a diagram of a conventional motor system.

In the various figures of the drawings, the same numerals designate the same or similar parts. Furthermore, when the term "first", "second", "third", "fourth", "inner", "outer" "top", "bottom" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Figure 2:
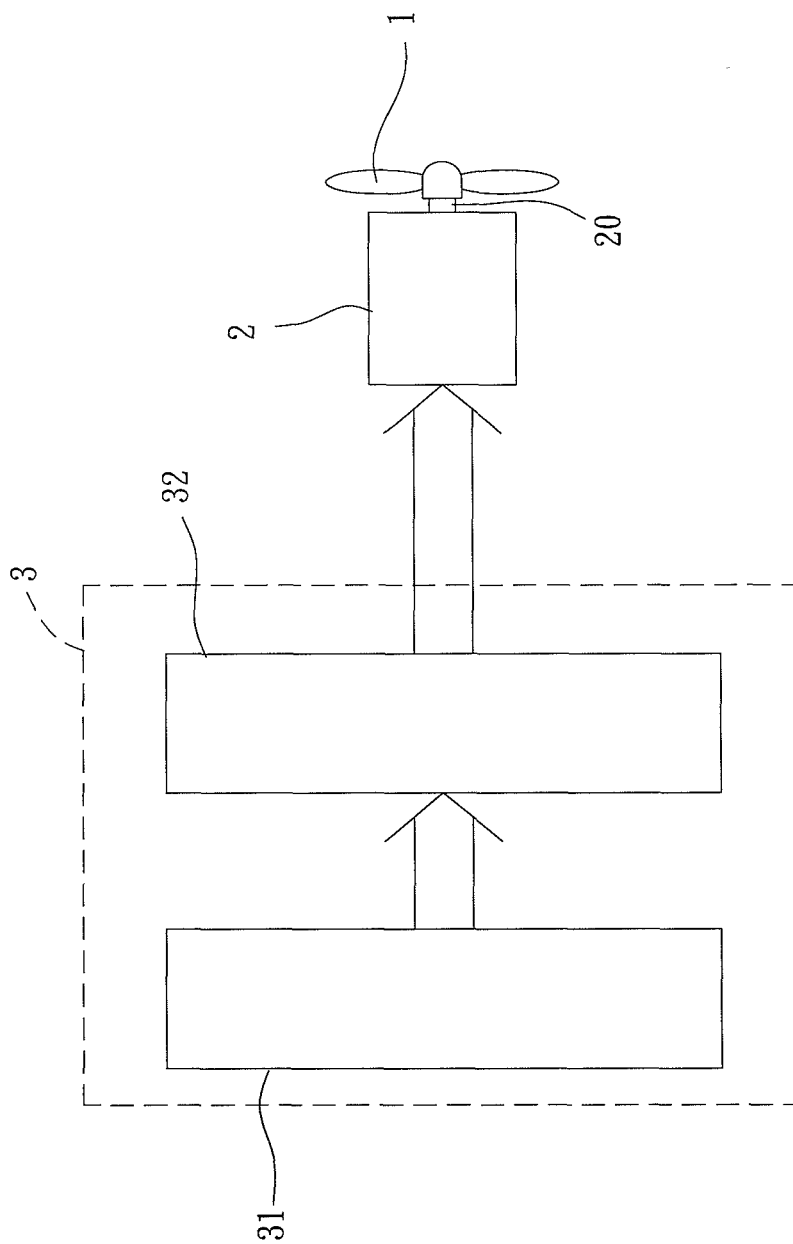
FIG. 2 shows a diagram of a motor system according to a first embodiment of the invention.

Referring to FIG. 2, a motor system is disclosed according to a first embodiment of the invention. The motor system is coupled to an impeller 1 for cooling purposes of a fan. The motor system comprises a motor 2 and a driving module 3. The motor 2 comprises a stator comprising a plurality of independent coils not electrically connected to each other. The driving module 3 comprises a control unit 31 and a driving unit 32. The control unit 31 is coupled to the driving unit 32 so that the control unit 31 may output a control signal to the driving unit 32. Upon receipt of the control signal, the driving unit 32 generates a driving signal to control the directions of currents passing through the coils.

When the motor system is applied to the fan in an electronic device, a rotor 20 of the motor 2 is coupled to the impeller 1 so that the motor 2 may drive the impeller 1 to rotate. In this way, cooling of the electronic device is achieved.

Figure 3:
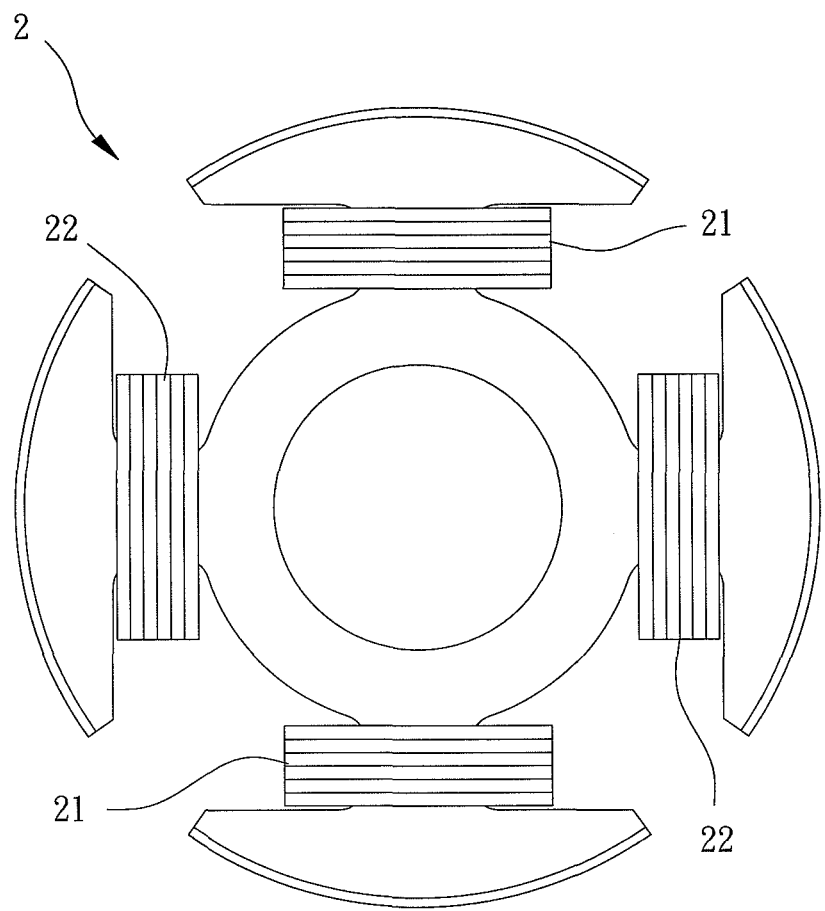
FIG. 3 shows a winding arrangement of a single-phased motor of the motor system according to the first embodiment of the invention.
Figure 4A:
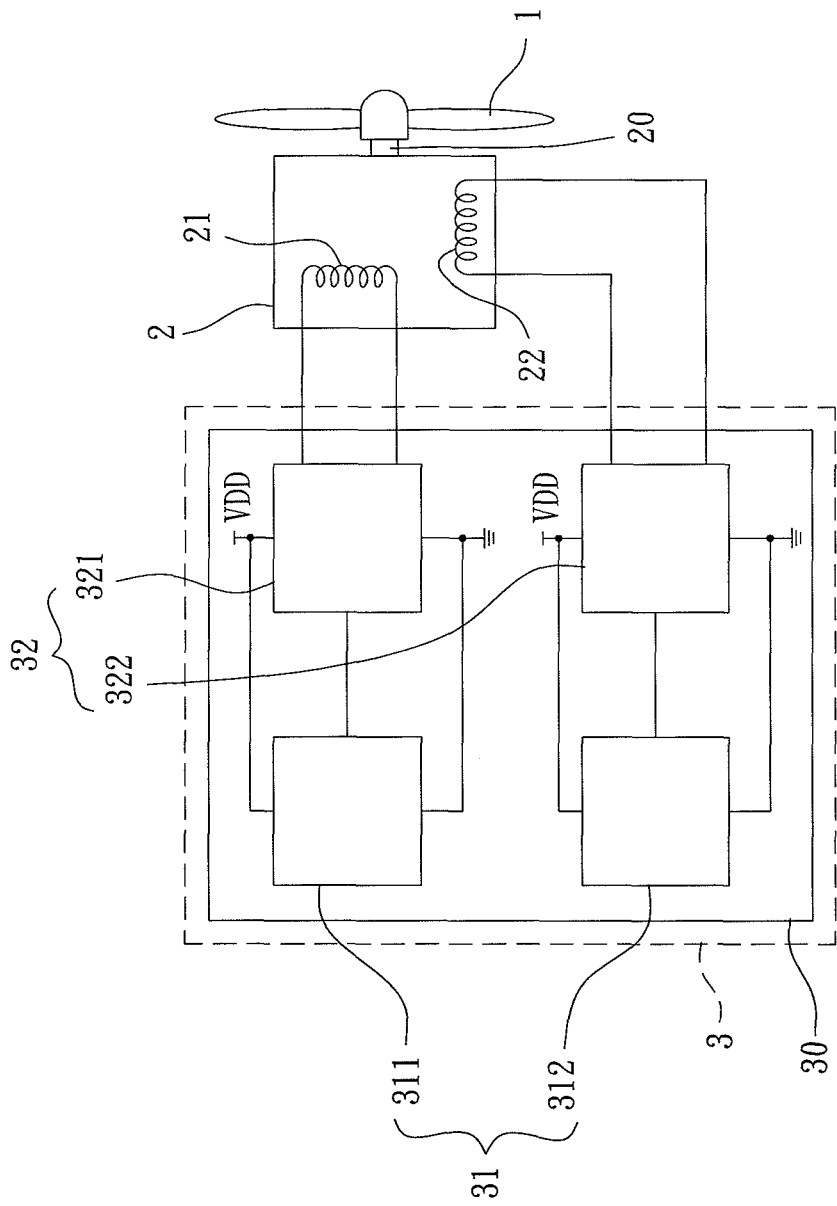
FIG. 4a shows a circuit diagram of the motor system according to the first embodiment of the invention.

Referring to FIGS. 3 and 4a, a motor system is disclosed according to the first embodiment of the invention. In the embodiment, the motor 2 is implemented as a single-phased motor and two coil loops are formed between the motor 2 and the driving unit 32.

In FIG. 3, the motor 2 comprises a first coil unit 21 and a second coil unit 22. The motor 2 comprises four salient-poles, wherein the winding of two opposing salient-poles forms the first coil unit 21 and the winding of another two opposing salient-poles forms the second coil unit 22. For example, two opposing salient-poles are wound and the windings of the two salient-poles are connected in series to foam the first coil unit 21.

Referring to FIG. 4a, the driving unit 32 may comprise a plurality of driving circuits, with the number of the driving circuits being the same as that of the coil units. Take the first embodiment as an example, the driving unit 32 comprises a first driving circuit 321 and a second driving circuit 322 in comply with the first coil unit 21 and the second coil unit 22. The first driving circuit 321 is electrically connected the first coil unit 21 to form a first coil loop and the second driving circuit 322 is electrically connected to the second coil unit 22 to form a second coil loop. The first and second coil loops are independent from each other.

Referring to FIG. 4a again, the control unit 31 comprises a plurality of controllers, with the number of the controllers being the same as that of the driving circuits. Take the first embodiment as an example, the control unit 31 may comprise a first controller 311 electrically connected to the first driving circuit 321 and a second controller 312 electrically connected to the second driving circuit 322. The first controller 311 and the second controller 312 simultaneously generate two identical control signals, each being delivered to a different driving circuit 321 or 322. Based on the received control signals, the first controller 311 and the second controller 312 simultaneously generate two identical driving signals, each being delivered to a different coil unit 21 or 22 for controlling the directions of the currents passing through the first coil unit 21 and the second coil unit 22.

Figure 4B:
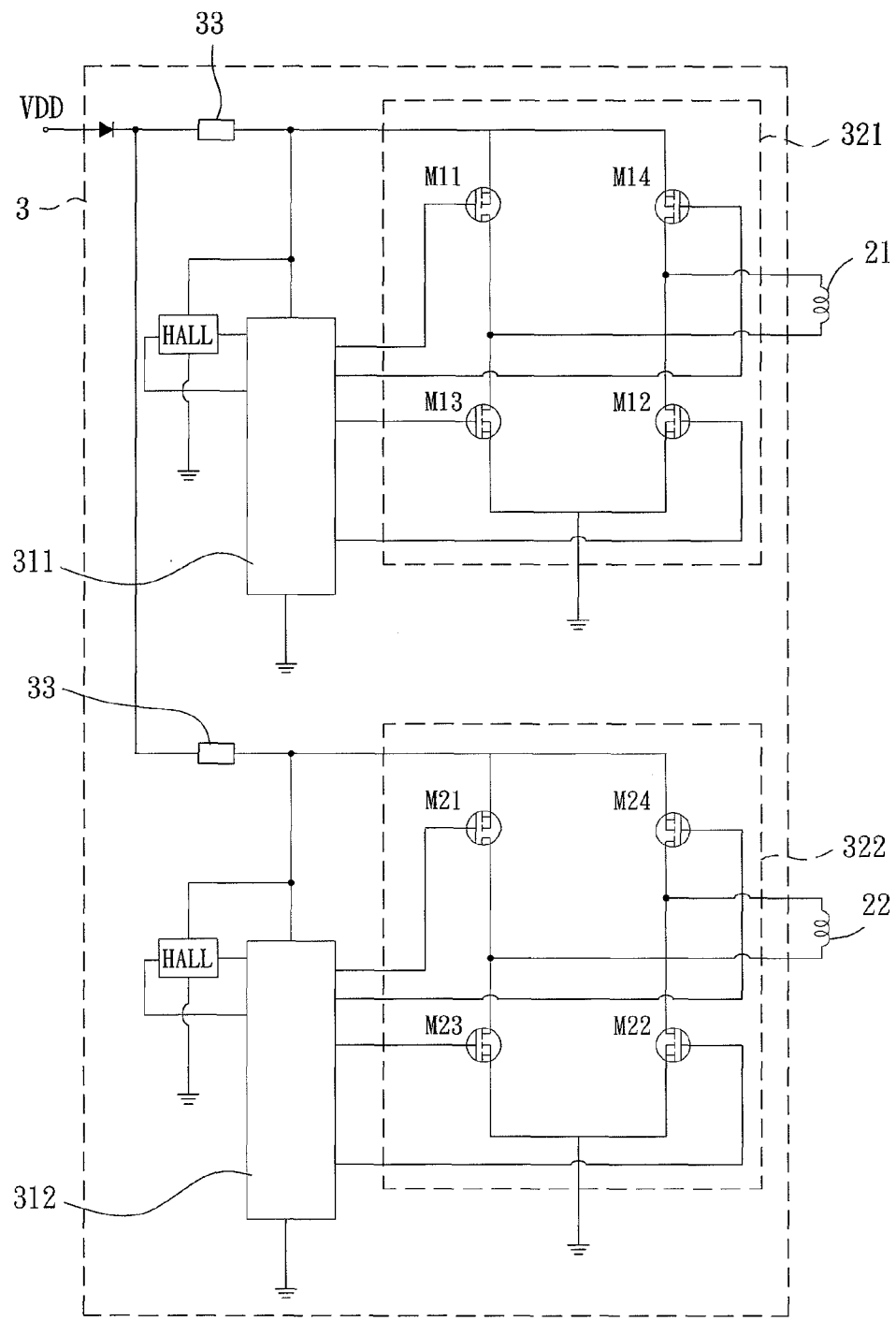

Assume that the motor 2 is a single-phased brushless direct current (BLDC) motor, the first controller 311 and the second controller 312 may be respectively connected to a Hall sensor so as to receive Hall sensing signals therefrom, as shown in FIG. 4b. Upon receipt of the Hall sensing signals, the first controller 311 and the second controller 312 simultaneously generate two identical driving signals for driving the first driving circuit 321 and the second controller 312.

Referring to FIG. 4a again, the driving module 3 further comprises a circuit board 30 on which the first controller 311, second controller 312, first driving circuit 321 and second driving circuit 322 are mounted. Based on this, a layout of the circuit board 30 is implemented.

The first driving circuit 321 and the second driving circuit 322 may be a bridge-structured circuit consisting of a plurality of transistor switches. The transistor switches may be MOS transistors, BJT transistors or IGBTs, but are not limited thereto.

More specifically, referring to FIG. 4b, a detailed circuit diagram of the driving module 3 in connection to the first coil unit 21 and the second coil unit 22 is shown according to the first embodiment of the invention. The first controller 311, second controller 312, first driving circuit 321, second driving circuit 322, as well as related peripheral components such as a plurality of protection components 33, may all be mounted on the circuit board 30.

Referring to FIG. 4b again, the first driving circuit 321 forms the bridge-structured circuit through transistor switches M11, M12, M13 and M14. The transistor switches M11 and M13 are connected in series and the transistor switches M12 and M14 are connected in series. A node where the transistor switches M11 and M13 are connected is electrically connected to an end of the first coil unit 21, whereas a node where the transistor switches M12 and M14 are connected is electrically connected to another end of the first coil unit 21.

The first controller 311 comprises an output port having four control ends, each being electrically connected to an input end of a transistor switch M11, M12, M13 or M14. The input ends of the transistor switches M11 to M14 may be gates. The first controller 311 may generate a set of control signals on the output port, with each control signal being generated at a respective control end of the output port. The set of control signals are sent to the input ends of the transistor switches M11 to M14 for controlling a direction of a current passing through the first coil unit 21.

Similarly, the second driving circuit 322 also forms another bridge-structured circuit through transistor switches M21, M22, M23 and M24. The connection between the second driving circuit 322 and the second coil unit 22 is similar to that between the first driving circuit 321 and the first coil unit 21, so it is not described herein again for brevity. Furthermore, the second controller 312 also comprises an output port having four control ends, each being electrically connected to an input end of a transistor switch M21, M22, M23 or M24. Thus, the second controller 312 is able to control a direction of a current passing through the second coil unit 22.

Referring to FIG. 4b again, the driving module 3 further comprises a plurality of protection components 33 (such as a fuse). The number of the protection components 33 is the same as that of the driving circuits. Each protection component 33 is connected between a supply voltage VDD and the driving circuit 321 or 322. Specifically, a protection component 33 is electrically connected between the supply voltage VDD and the first driving circuit 321 and another protection component 33 is electrically connected between the supply voltage VDD and the second driving circuit 322. Through the protection components 33, one of the first driving circuit 321 and the second driving circuit 322 is protected when another one is burned out due to an abnormal current passing therethrough.

In the first embodiment above, the first controller 311 and the first driving circuit 321 may be integrated into a first driving integral chip (IC). Similarly, the second controller 312 and the second driving circuit 322 may be integrated into a second driving IC.

The number of turns of the first coil unit 21 is preferably the same as that of the second coil unit 22. However, due to some factors such as costs and rated current of the first driving circuit 321 and the second driving circuit 322, the number of turns of the first coil unit 21 may be different from that of the second coil unit 22. In addition, the first coil unit 21 may or may not have the same wire diameter as that of the second coil unit 22 based on the above factors.

For example, assume that a motor with a rated current of 0.6 A has independent first coil unit 21 and second coil unit 22 having the same number of turns and wire diameter. In this case, a maximal current of 0.3 A is allowed to pass the first coil unit 21 and the second coil unit 22. At this point, if the available first driving circuit 321 and the second driving circuit 322 are of rate current either 0.2 A or 0.4 A, then only the ones with rate current 0.4 A can be used. Furthermore, in consideration of the costs of the first driving circuit 321 and the second driving circuit 322, the winding of the first coil unit 21 and the second coil unit 22 may have another implementation as described below. Firstly, the first coil unit 21 is designed to have 200 turns so as to allow the passage of a 0.4

A current. In addition, the second coil unit 22 is designed to have 400 turns, with the length thereof being twice longer than that of the first coil unit 21. Although the allowable current of the second coil unit 22 is reduced to 0.2 A due to the resistance thereof becomes twice larger, the second coil unit 22 still generates a magnetomotive force having the same magnitude as a magnetomotive force generated by the first coil unit 21. In such a case, one of the first driving circuit 321 and second driving circuit 322 may be chosen to have a rated current of 0.4 A while the other one may be chosen to have a rated current of 0.2 A. In this way, costs of the driving unit 32 are reduced.

Referring to FIGS. 4a and 4b again, when the proposed motor system is in a normal operation, the first driving circuit 321 and second driving circuit 322 may drive the first coil unit 21 and the second coil unit 22, respectively, causing the first coil unit 21 and the second coil unit 22 to respectively generate an alternating magnetic field interacting with a magnet (not shown) of a rotor 20. Thus, rotation of the impeller 1 is triggered.

When one of the first coil unit 21 and second coil unit 22 stops operating due to a malfunction of a corresponding coil loop, the rotation of the rotor 20 can still be maintained by another normal coil loop based on the independence of the coil loops.

Figure 5:
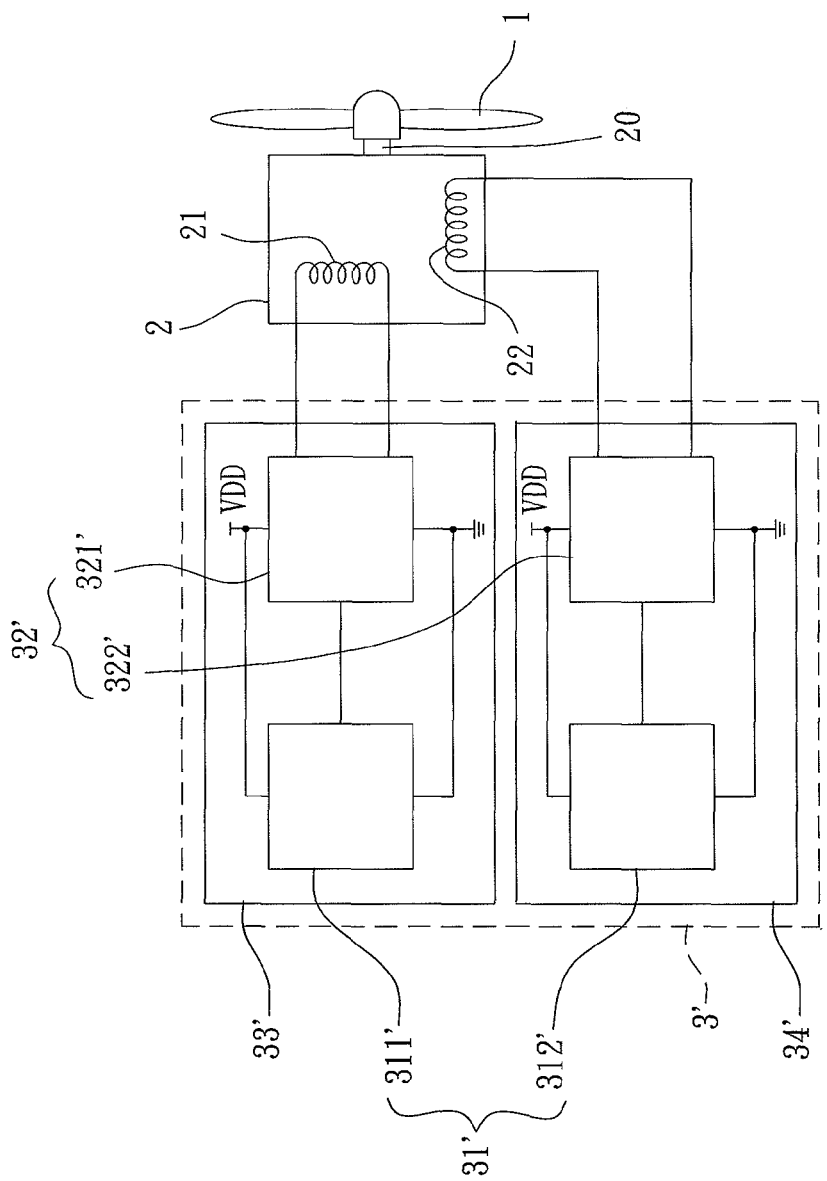
FIG. 5 shows a diagram of a motor system according to a second embodiment of the invention.

Referring to FIG. 5, a motor system is disclosed according to a second embodiment of the invention. In comparison with the first embodiment, the driving module 3' comprises a plurality of circuit boards, with the number of the circuit boards being the same as that of the driving circuits. More specifically, as shown in FIG. 5, the driving module 3' comprises a control unit 31', a driving unit 32', a first circuit board 33' and a second circuit board 34'. The control unit 31' comprises a first controller 311' and a second controller 312'. The driving unit 32' comprises a first driving circuit 321' and a second driving circuit 322'. The first controller 311' and the first driving circuit 321' are mounted on the first circuit board 33', whereas the second controller 312' and the second driving circuit 322' are mounted on the second circuit board 34'.

Figure 6:
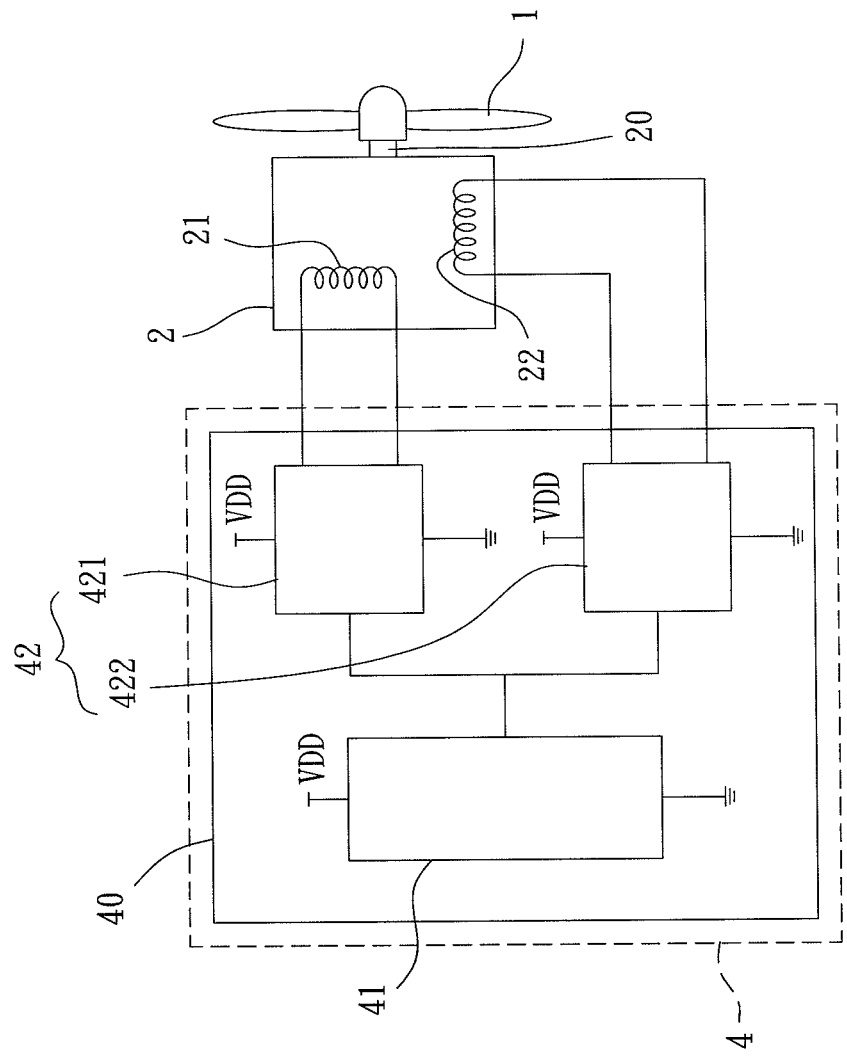
FIG. 6 shows a diagram of a motor system according to a third embodiment of the invention.

Referring to FIG. 6, a motor system is shown according to a third embodiment of the invention. In comparison with the first embodiment, a driving unit 42 of a driving module 4 comprises a first driving circuit 421 and a second driving circuit 422 controlled by a single control signal. Hence, the control unit 41 of the driving module 4 may be replaced by a single control IC to control the first driving circuit 421 and the second driving circuit 422. In other words, the control IC may have an output port electrically connected to the first driving circuit 421 and the second driving circuit 422. Through the control signal generated by the control IC, the first driving circuit 421 and the second driving circuit 422 may be controlled.

Referring to FIG. 6 again, the driving module 4 in the third embodiment further comprises a circuit board 40. Based on this, the control IC, first driving circuit 421, second driving circuit 422, as well as related components such as protection components (not shown), may all be mounted on the circuit board 40.

Figure 7:
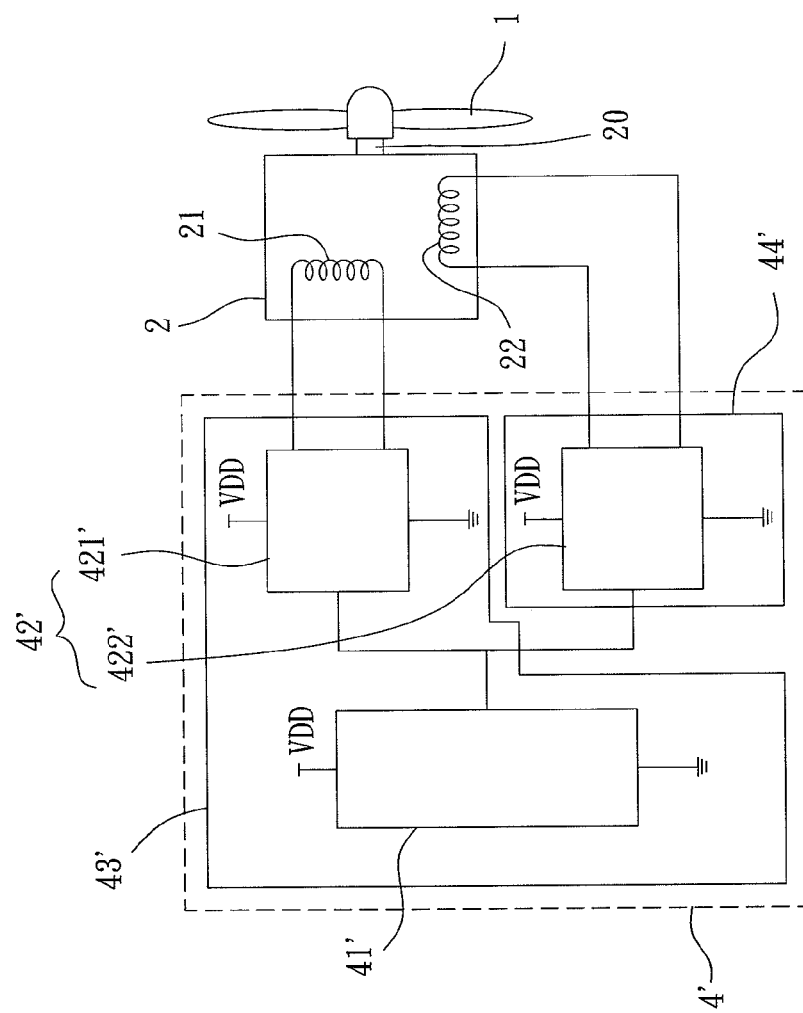
FIG. 7 shows a diagram of a motor system according to a fourth embodiment of the invention.

Referring to FIG. 7, a motor system is shown according to a fourth embodiment of the invention. In comparison with the third embodiment, a driving module 4' comprises a plurality of circuit boards, with the number of the circuit boards being the same as that of the driving circuits. More specifically, the driving module 4' comprises a control unit 41', a driving unit 42', a first circuit board 43' and a second circuit board 44'. The driving unit 42' comprises a first driving circuit 421' and a second driving circuit 422'. The first circuit board 43' is mounted with the first driving circuit 421' and the second circuit board 44' is mounted with the second driving circuit 422'. The control unit 41' may be mounted on either circuit board 43' or 44'. In the embodiment, the control unit 41' is mounted on the first circuit board 43'.

Figure 8:
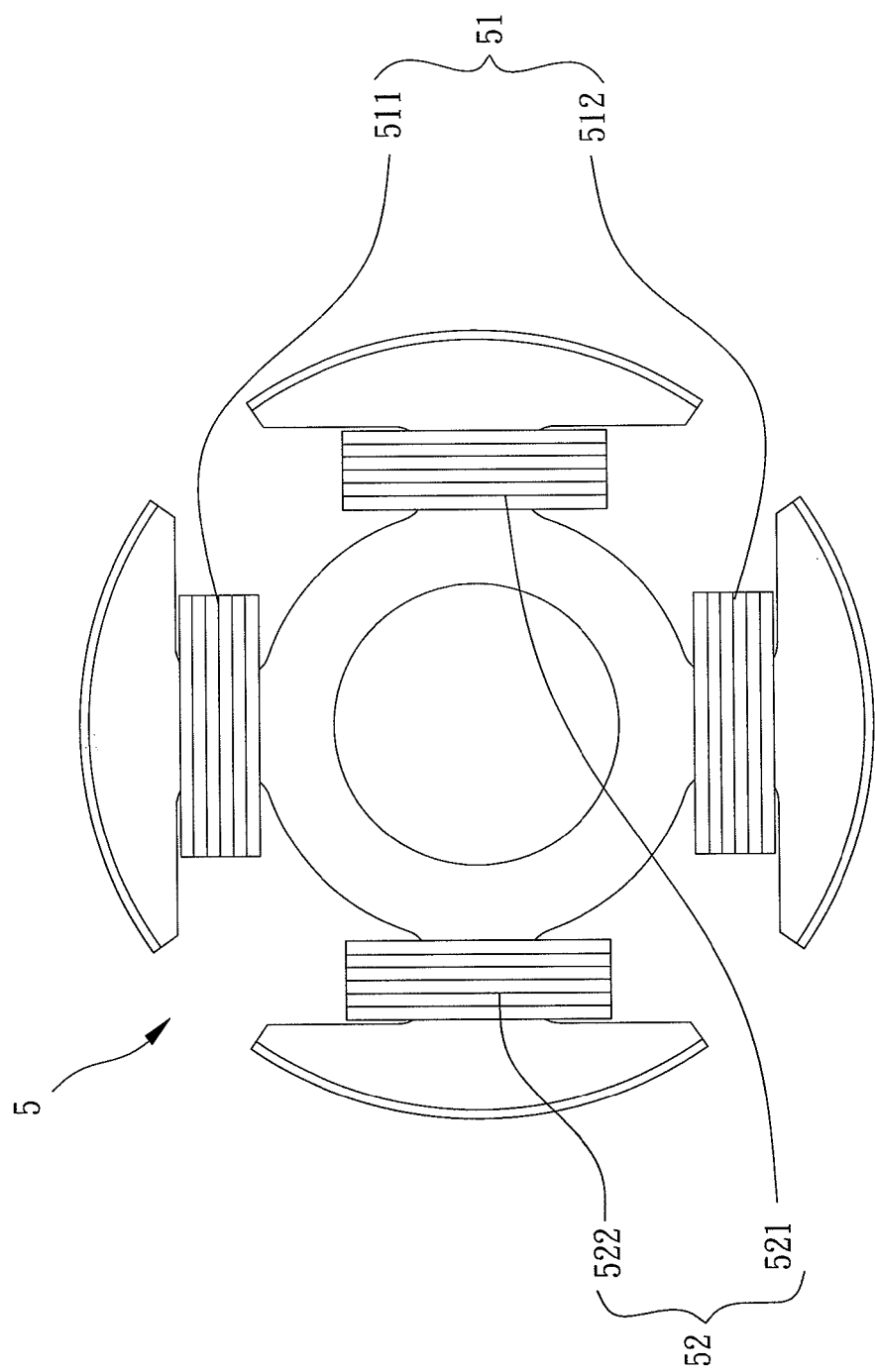
FIG. 8 shows a winding arrangement of a double-phased motor of a motor system according to a fifth embodiment of the invention.
Figure 9:
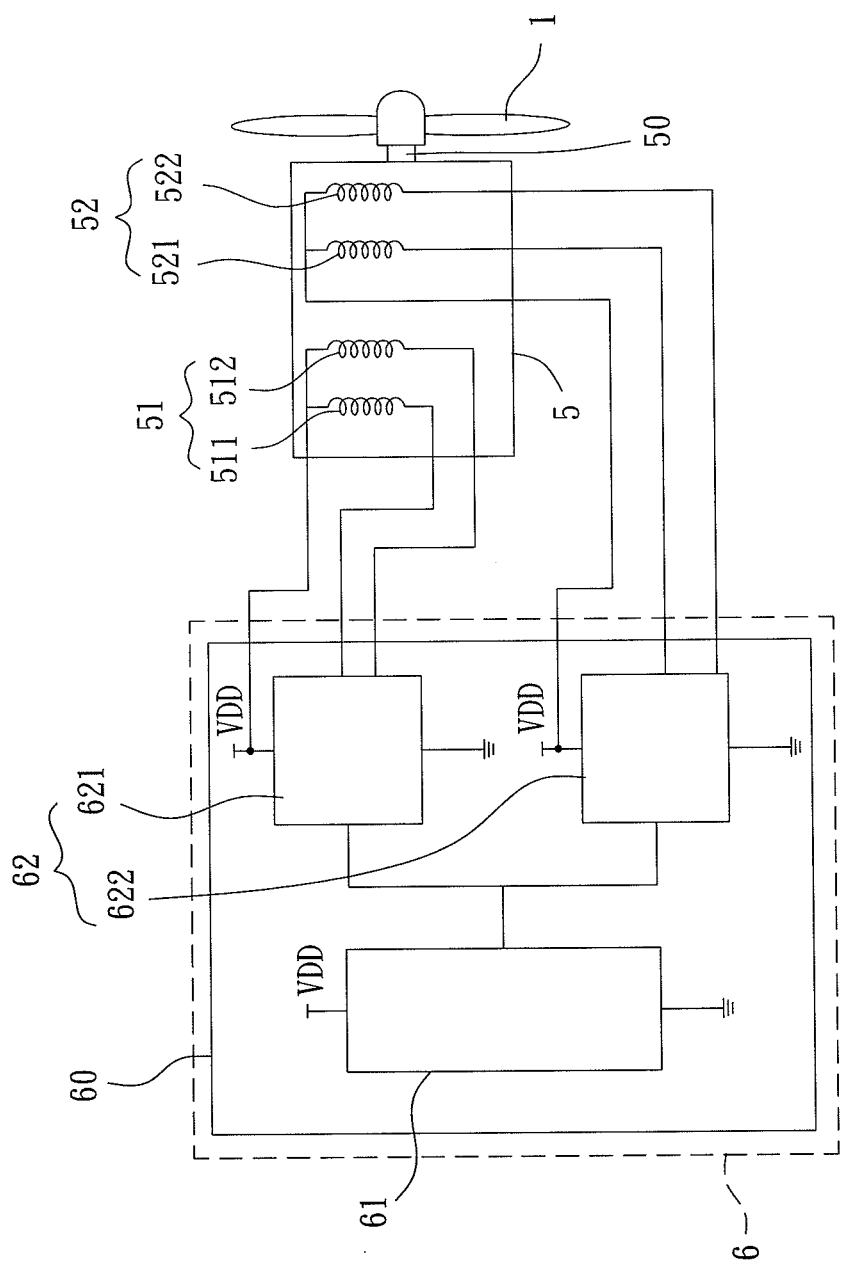
FIG. 9 shows a circuit diagram of the motor system according to the fifth embodiment of the invention.

Referring to FIGS. 8 and 9, a motor system is shown according to a fifth embodiment of the invention. In comparison with the first embodiment, the motor system comprises a motor 5 and a driving module 6. The motor 5 is implemented as a double-phased motor and comprises a rotor 50, a first coil unit 51 and a second coil unit 52. The driving module 6 comprises a control unit 61 and a driving unit 62. The driving unit 62 comprises a first driving circuit 621 and a second driving circuit 622.

Referring to FIG. 9 again, since the motor 5 is a double-phased motor, the first coil unit 51 comprises a first-phased coil 511 and a second-phased coil 512. In addition, the second coil unit 52 also comprises a first-phased coil 521 and a second-phased coil 522.

Referring to FIG. 9 again, when the motor system is applied to a fan, the impeller 1 is coupled to the rotor 50 of the motor 5 in order for the impeller 1 to be driven by the motor 5. Both the first-phased coil 511 and the second-phased coil 512 have an end electrically connected to the supply voltage VDD. In addition, both the first-phased coil 511 and the second-phased coil 512 have another end connected to two ends of the first driving circuit 621. Based on this, the first driving circuit 621 and the first coil unit 51 form a first coil loop. Similarly, both the first-phased coil 521 and the second-phased coil 522 has an end electrically connected to the supply voltage VDD, as well as another end electrically connected to two ends of the second driving circuit 622. Based on this, the second driving circuit 622 and the second coil unit 52 form a second coil loop. Note the first coil loop is independent from the second coil loop. Furthermore, the control unit 61 is electrically connected to the driving unit 62 such that the control unit 61 may generate a control signal to control the first and second coil loops.

Referring to FIG. 9 again, the driving module 6 further comprises a circuit board 60. The control unit 61, first driving circuit 621, second driving circuit 622, as well as related components such as protection components (not shown), may be mounted on the circuit board 60.

Similarly to the fourth embodiment, the control unit 61, first driving circuit 621 and second driving circuit 622 may also be mounted on a plurality of circuit boards.

Assume that the motor 5 is a double-phased BLDC motor, the driving module 6 further comprises a Hall sensor (not shown) electrically connected to the control unit 61 so that the control unit 61 may receive a Hall sensing signal from the Hall sensor. Upon receipt of the Hall sensing signal, the control unit 61 generates the control signal to control the first driving circuit 621 and second driving circuit 622.

Figure 10:
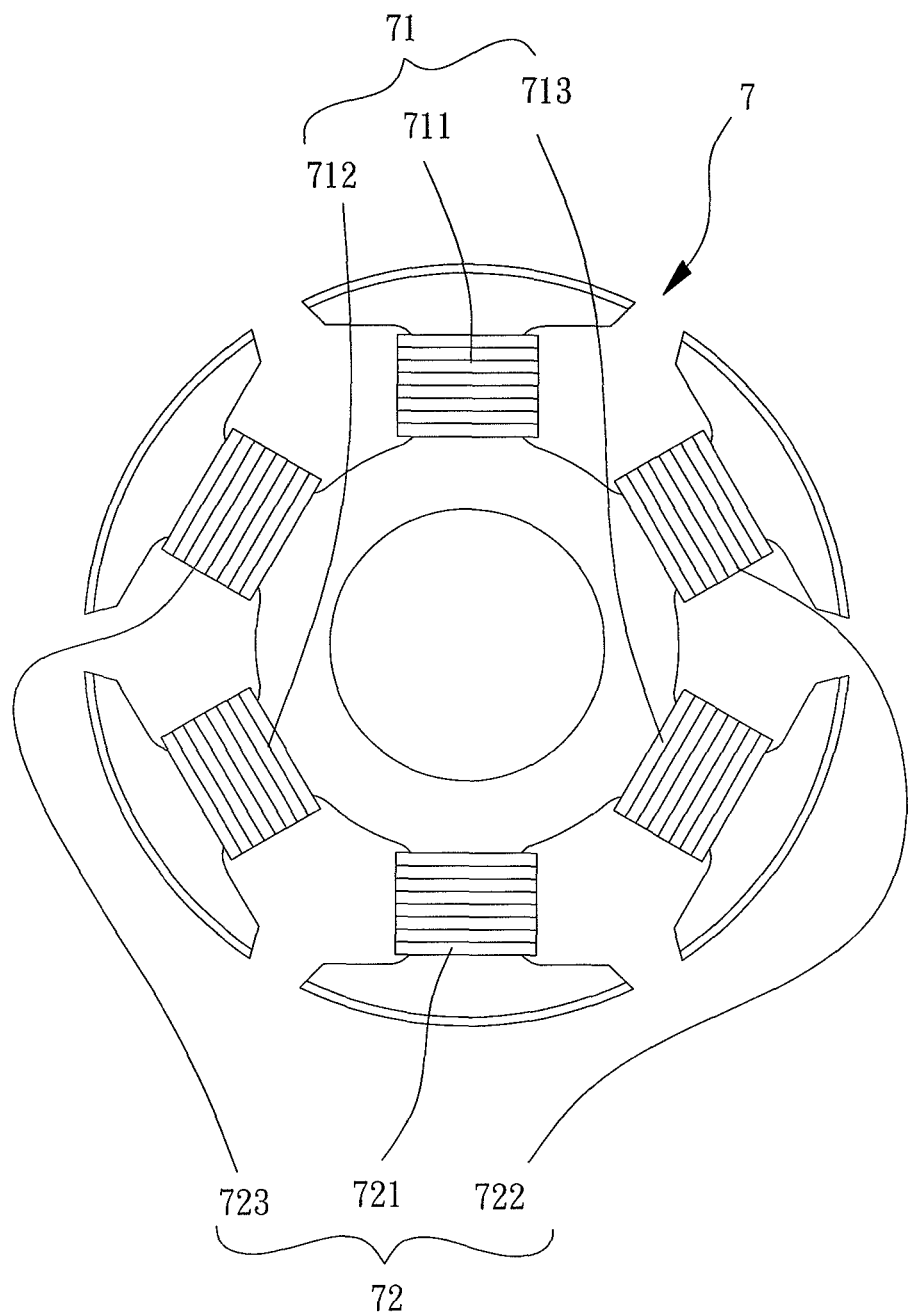
FIG. 10 shows a winding arrangement of a triple-phased motor of a motor system according to a sixth embodiment of the invention.
Figure 11:
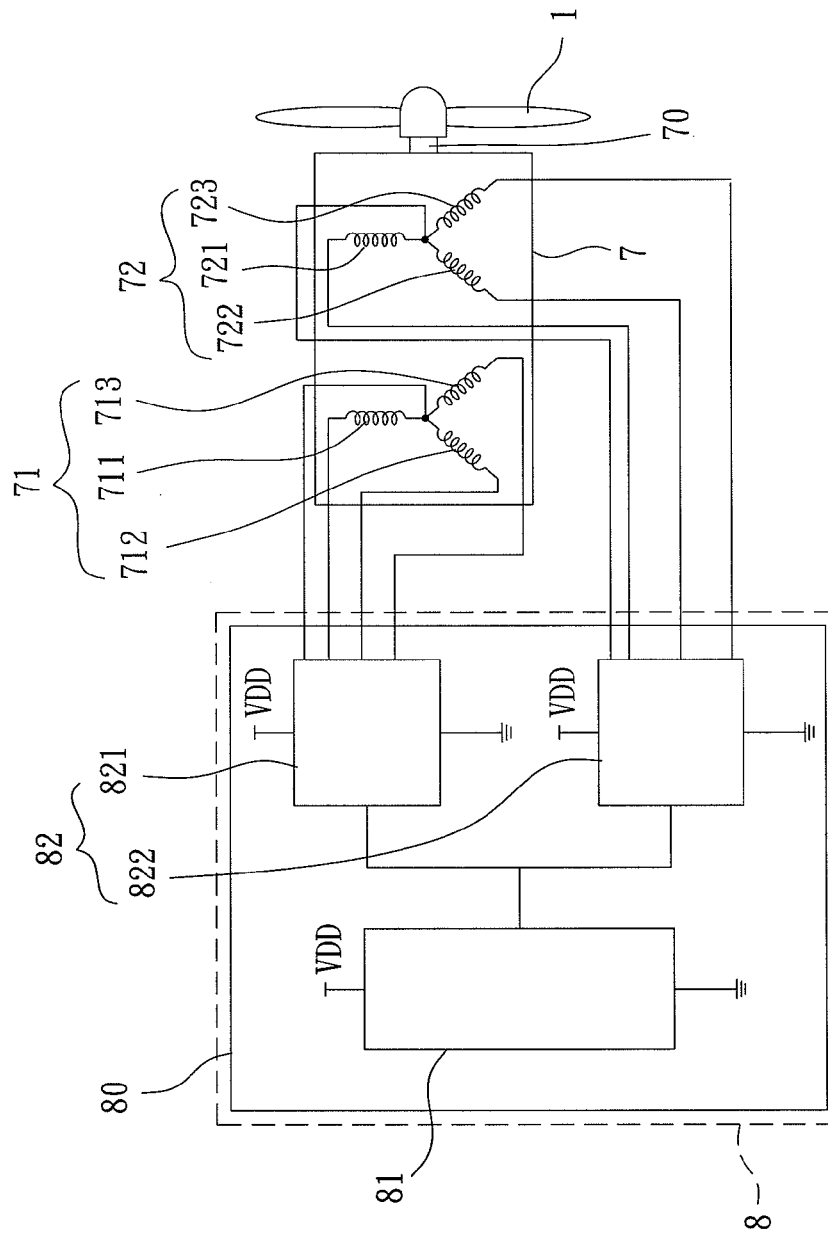
FIG. 11 shows a circuit diagram of the motor system according to the sixth embodiment of the invention.

Referring to FIGS. 10 and 11, a motor system is shown according to a sixth embodiment of the invention. In comparison with the first embodiment, the motor system comprises a motor 7 and a driving module 8. The motor 7 is a triple-phased motor and comprises a rotor 70, a first coil unit 71 and a second coil unit 72. The driving module 8 comprises a control unit 81 and a driving unit 82. The driving unit 82 comprises a first driving circuit 821 and a second driving circuit 822.

Referring to FIG. 10, since the motor 7 is a triple-phased motor; the first coil unit 71 comprises a first-phased coil 711, a second-phased coil 712 and a third-phased coil 713. Similarly, the second coil unit 72 also comprises a first-phased coil 721, a second-phased coil 722 and a third-phased coil 723.

Referring to FIG. 11 again, when the motor system in the embodiment is applied to a fan, the impeller 1 is coupled to a rotor 70 of the motor 7. All the first-phased coil 711, second-phased coil 712 and third-phased coil 713 have an end preferably connected together to form a Y-shaped connection, as well as another end connected to three ends of the first driving circuit 821. The Y-shaped first coil unit 71 has a neutral end connected to the first driving circuit 821. In this arrangement, the first driving circuit 821 and first coil unit 71 form a first coil loop. Similarly, all the first-phased coil 721, second-phased coil 722 and third-phased coil 723 also have an end connected together, as well as another end connected to three ends of the second driving circuit 822. In this way, the second driving circuit 822 and the second coil unit 72 form a second coil loop independent from the first coil loop. Furthermore, the control unit 81 is electrically connected to the driving unit 82 such that the control unit 81 may generate the control signal to control the first and second coil loops.

Referring to FIG. 11 again, the driving module 8 further comprises a circuit board 80. The control unit 81, first driving circuit 821, second driving circuit 822, as well as related components such as protection components (not shown), may be mounted on the circuit board 80.

Similarly to the fourth embodiment, the control unit 81, first driving circuit 821 and second driving circuit 822 may also be mounted on a plurality of circuit boards.

Assume that the motor 7 is a triple-phased BLDC motor, the driving module 8 further comprises a triple-phased Hall sensor module (not shown) electrically connected to the control unit 81 so that the control unit 81 may receive a Hall sensing signal from the Hall sensor module. Upon receipt of the Hall sensing signal, the control unit 81 generates the control signal to control the first driving circuit 821 and second driving circuit 822.

In conclusion, the invention is capable of maintaining operations of a motor when one of the coil loops is broken. This is because that the coil loops are independent from each other so that the operations of the motor may be maintained by another normally-functioning coil loop. The invention greatly reduces the costs, volume and weight of a motor system by using only a single motor instead of two motors.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A motor system, comprising:
  a motor having a plurality of coil units not electrically connected to each other, wherein each of the coil units have different numbers of turns or different wire diameters; and
  a driving module, comprising:
    a control unit;
    a driving unit coupled to the control unit and having a plurality of driving circuits, wherein the number of the driving circuits is the same as the number of the coil units and each of the driving circuits is coupled to a respective one of the coil units so as to form a plurality of independent coil loops, wherein the driving module further comprises a plurality of protection components, each connected in series between a supply voltage and a respective one of the driving circuits, and wherein the number of the protection components is the same as the number of the driving circuits; and
    a circuit board mounted with the control unit and the driving unit.

2. The motor system as claimed in claim 1, wherein the control unit comprises a plurality of controllers, the number of the controllers is the same as the number of the driving circuits, and each of the controllers is coupled to a respective one of the driving circuits.

3. The motor system as claimed in claim 2, wherein the controllers and the driving circuits are integrated into a driving integral chip (IC).

4. The motor system as claimed in claim 1, wherein the control unit is a control integral chip (IC) having an output port coupled to the driving circuits.

5. The motor system as claimed in claim 1, wherein each of the driving circuits is a bridge-structured circuit formed by a plurality of transistor switches.

6. The motor system as claimed in claim 1, wherein the motor is a single-phased, double-phased or triple-phased motor.

7. The motor system as claimed in claim 1, wherein the motor has a rotor coupled to an impeller.

8. A motor system, comprising:
  a motor having a plurality of coil units not electrically connected to each other, wherein each of the coil units have different numbers of turns or different wire diameters; and
  a driving module, comprising:
    a control unit;
    a driving unit coupled to the control unit and having a plurality of driving circuits, wherein the number of the driving circuits is the same as the number of the coil units and each of the driving circuits is coupled to a respective one of the coil units so as to form a plurality of independent coil loops, .wherein the driving module further comprises a plurality of protection components, each connected in series between a supply voltage and a respective one of the driving circuits, and wherein the number of the protection components is the same as the number of the driving circuits; and
    a plurality of circuit boards, wherein the number of the circuit boards is the same as the number of the driving circuits, and each of the circuit boards is mounted with a respective one of the driving circuits.

9. The motor system as claimed in claim 8, wherein the control unit comprises a plurality of controllers, the number of the controllers is the same as the number of the driving circuits, and each of the controllers is coupled to a respective one of the driving circuits.

10. The motor system as claimed in claim 9, wherein each of the circuit boards is mounted with a respective one of the controllers.

11. The motor system as claimed in claim 10, wherein the controllers and the driving circuits are integrated into a driving integral chip (IC).

12. The motor system as claimed in claim 8, wherein the control unit is a control integral chip (IC) having an output port coupled to the driving circuits.

13. The motor system as claimed in claim 12, wherein the control IC is mounted on one of the circuit boards.

14. The motor system as claimed in claim 8, wherein each of the driving circuits is a bridge-structured circuit formed by a plurality of transistor switches.

15. The motor system as claimed in claim 8, wherein the motor is a single-phased, double-phased or triple-phased motor.

16. The motor system as claimed in claim 8, wherein the motor has a rotor coupled to an impeller.

\* \* \* \* \*